United States Patent Office 2,830,091
Patented Apr. 8, 1958

2,830,091
OLEFIN HYDRATION

Bernard S. Friedman, Chicago, and Fred L. Morritz, Park Forest, Ill., assignors to Sinclair Refining Company, New York, N. Y., a corporation of Maine No Drawing. Application June 10, 1955
Serial No. 514,711

3 Claims. (Cl. 260—614)

Our invention relates to an improved method for the hydration of monoolefin hydrocarbons.

It is old in the art to hydrate monoolefin hydrocarbons, particularly those containing from 2 to 4 carbon atoms, to produce oxygenated products which are generally alcohols or ethers and polymer. For example, propylene has thus been hydrated to produce isopropyl alcohol, diisopropyl ether and polypropylene. The relative proportions of ether and alcohol produced depend upon the reaction conditions which are used, and the amount of polymer produced is generally minor. As catalysts for the hydration reaction, sulfuric acid and benzene monosulfonic acid have been suggested.

In accordance with our present invention, we have devised an improved process for the hydration of monoolefin hydrocarbons, or mixtures thereof, containing from 2 to 4 carbon atoms which involves the use as the hydration catalyst of one or more halogenated alkylene or halogenated benzene polycarboxylic acids containing from 3 to 10 carbon atoms, the aliphatic alpha-carbon atoms of which, if present, are completely substituted by fluorine or chlorine. When the hydration process is carried out using as the catalyst one or more compounds of the type just indicated, a higher reaction rate and increased stability of the catalyst are realized.

As a specific illustration of an operation falling within the scope of our invention, one thousand pounds per hour of a liquid mixed propane-propylene feed containing 65 percent by weight of propylene is introduced into the bottom of a tower packed with about 80 cubic feet of stoneware Raschig rings. The tower is operated at a pressure of 600 p. s. i. g. and at a temperature of 300° F. Lean acid containing 90 percent by weight of tetrafluorosuccinic acid is introduced into the top of the tower at the rate of 2,000 pounds per hour. A lean mixture of propylene and propane is withdrawn from the top of the tower and from the bottom of the tower there is withdrawn fat acid. The fat acid is admixed with steam in the amount of approximately 100 pounds per hour, the steam having a temperature of about 350° F. The mixture is then introduced into a vessel maintained at about atmospheric pressure and 300° F. In this vessel a mixture of propyl alcohol, isopropyl alcohol, isopropyl ether and polymer is released from the fat acid and is withdrawn overhead, forming lean acid which is pumped through a heater and then into the top of the packed tower as already described. The amount of steam admixed with the fat acid is adjusted so as to maintain the composition of the lean acid at about 90 percent by weight of tetrafluorosuccinic acid.

Various modifications can be made in the process just described to provide other embodiments which fall within the scope of our invention. For example, instead of the mixed propane-propylene feed there can be substituted pure propylene or propane-propylene mixtures containing as little as about 25 percent by weight of propylene. In addition, ethane-ethylene mixtures or butane-butylene mixtures similar to the propane-propylene mixtures can be utilized, as can also pure ethylene or a pure butylene. In the tower in which the lean acid and monoolefin are reacted, a wide variety of temperatures and pressures can be used, the reaction temperature generally being within the range from about 250 to 400° F. and the pressure generally being within the range from about 500 to 3,000 p. s. i. g.

A wide variety of carboxylic acids can be substituted for the tetrafluorosuccinic acid utilized in the specific illustration, among them being tetrachlorosuccinic acid; difluoromalonic acid; dichloromalonic acid; alpha,alpha,alpha',alpha'-tetrafluoroadipic acid; alpha,alpha,alpha',alpha'-tetrachloroadipic acid; alpha,alpha,alpha',alpha',beta,beta-hexafluoroadipic acid; perfluoroadipic acid; 1,1,4,4-benzenetetrachloro-2,3-dicarboxylic acid; 1,1,4,4-benzenetetrafluoro-2,3-dicarboxylic acid; 1,3,5-trichlorochlorobenzene-2,4,6-tricarboxylic acid; 1,3,5-trifluorobenzene-2,4,6-tricarboxylic acid; 2,3,5,6-tetrafluoroterephthalic acid; 2,3-dichloroterephthalic acid; and so forth.

In general, the aqueous lean acid introduced into the top of the packed tower will have an acid concentration of from about 80 to 95 percent by weight.

In the specific illustration, the reaction between the monoolefin and water was conducted in a packed tower, but the particular apparatus used is not an essential part of our invention. For example, in place of a packed tower the reaction can be carried out in a stirred autoclave or in a centrifuge contacter, for example. Moreover, the step in which the alcohol, ether and polymer are released from the fat acid, thereby forming the lean acid for recycle, can be conducted if desired, with the aid of a vacuum or by blowing the fat acid with nitrogen, propane or other inert gas, or by a solvent extraction operation employing as a solvent a hydrocarbon, for example, propane.

We claim:
1. In the hydration of a monoolefin having from 2 to 4 carbon atoms under hydration conditions, the step of conducting the hydration while the monoolefin is in contact with a catalytic amount of a halogenated polycarboxylic acid containing from 3 to 10 carbon atoms, with the proviso that when present the aliphatic alpha-carbon atoms thereof are completely substituted by a halogen selected from the group consisting of fluorine and chlorine and with the further proviso that said polycarboxylic acid is selected from the group consisting of chlorine-substituted alkylene polycarboxylic acids, fluorine-substituted alkylene polycarboxylic acids, chlorine-substituted benzene polycarboxylic acids, and fluorine-substituted benzene polycarboxylic acids.

2. The method of claim 1 wherein the monoolefin is propylene.

3. The method of claim 1 wherein said carboxylic acid is tetrafluorosuccinic acid.

References Cited in the file of this patent

UNITED STATES PATENTS

| | | |
|---|---|---|
| 2,020,673 | Dreyfus | Nov. 12, 1935 |
| 2,070,258 | Coleman et al. | Feb. 9, 1937 |
| 2,142,036 | Rowland et al. | Dec. 27, 1938 |
| 2,178,186 | Oldershaw | Oct. 31, 1939 |